United States Patent
Lee et al.

(10) Patent No.: US 7,274,640 B2
(45) Date of Patent: *Sep. 25, 2007

(54) APPARATUS AND METHOD FOR DETERMINING DISC TYPE

(75) Inventors: Moon-noh Lee, Gyeonggi-do (KR); Dong-jin Lee, Gyeonggi-do (KR); Gwang-ho Lee, Gyeonggi-do (KR); Hyun-seok Yang, Seoul (KR); Hong-gul Jun, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 603 days.

This patent is subject to a terminal disclaimer.

(21) Appl. No.: 10/229,134

(22) Filed: Aug. 28, 2002

(65) Prior Publication Data

US 2003/0048717 A1    Mar. 13, 2003

(30) Foreign Application Priority Data

Aug. 29, 2001   (KR) ............................. 2001-52562

(51) Int. Cl.
*G11B 7/00* (2006.01)
(52) U.S. Cl. ............................. 369/53.18; 369/44.28; 369/53.23
(58) Field of Classification Search ............. 369/53.18, 369/53.23
See application file for complete search history.

(56) References Cited

U.S. PATENT DOCUMENTS

| | | | |
|---|---|---|---|
| 4,710,908 A | 12/1987 | Ohshima et al. | |
| 5,572,494 A * | 11/1996 | Nakane et al. | 369/44.28 |
| 5,844,866 A | 12/1998 | Fujimoto et al. | |
| 6,097,680 A | 8/2000 | Yen et al. | |
| 6,298,024 B1 * | 10/2001 | Nomura | 369/53.22 |
| 6,424,606 B1 * | 7/2002 | Okazaki et al. | 369/44.32 |
| 6,785,208 B1 * | 8/2004 | Fujimoto et al. | 369/53.18 |
| 2002/0051411 A1 * | 5/2002 | Asakura | 369/44.28 |
| 2003/0053387 A1 * | 3/2003 | Lee et al. | 369/53.18 |
| 2003/0112728 A1 * | 6/2003 | Ono et al. | 369/53.18 |
| 2004/0105357 A1 * | 6/2004 | Shioya et al. | 369/44.29 |
| 2004/0218494 A1 * | 11/2004 | Lee et al. | 369/53.18 |
| 2005/0270942 A1 * | 12/2005 | King et al. | 369/53.15 |

FOREIGN PATENT DOCUMENTS

| | | |
|---|---|---|
| EP | 0 821 356 | 1/1998 |
| JP | 2000-173081 | 6/2000 |
| KR | 2001-17374 | 8/1999 |

* cited by examiner

*Primary Examiner*—Wayne Young
*Assistant Examiner*—Van T. Pham
(74) *Attorney, Agent, or Firm*—Staas & Halsey LLP (57) ABSTRACT

A disc type determining apparatus in a disc recording and reproducing apparatus in which vibrations generated by rotations of a disc occur in a focus and tracking control actuator includes an error gain adjusting unit, which adjusts an amplitude of a focus and tracking error in order to maintain a constant amplitude of the focus and tracking error; a loop gain adjusting unit which compares the closed loop phase of the focus and tracking control loop and a predetermined reference closed loop phase, and maintains a constant gain of the focus and tracking control loop; a vibration measuring unit which measures vibrations using the adjusted error and the output of a controller; and a disc type determining unit which extracts a predetermined signal to determine the type of a disc using the measured vibrations, measures the deflection, eccentricity, and mass eccentricity of a disc using the extracted signal.

40 Claims, 6 Drawing Sheets

FIG. 1A (PRIOR ART)

FOCUS ERROR

FIG. 1B (PRIOR ART)

TRACKING ERROR

APPARATUS AND METHOD FOR DETERMINING DISC TYPE

CROSS-REFERENCE TO RELATED APPLICATION

This application claims the benefit of Korean Application No. 2001-52562, filed Aug. 29, 2001 in the Korean Industrial Property Office, the disclosure of which is incorporated herein by reference.

BACKGROUND OF THE INVENTION

1. Field of the Invention

The present invention relates to an apparatus and method for optical disc drive operations, and more particularly, to a disc type determining apparatus and method in which vibrations generated in a drive by a disc are measured, and then, using the measured vibrations, determining whether the disc is a deflected disc, an eccentric disc, or a mass eccentric disc, and based on this determination, setting the transfer rate of the determined disc.

2. Description of the Related Art

Discs having a deflection, an eccentricity, and a mass eccentricity larger than those of a normal disc are referred to as a deflection disc, an eccentricity disc, and a mass eccentricity disc, respectively. In these special discs, disturbances occur caused by vibrations not damped by a servo in a focus and tracking control loop. Therefore, in a disc drive, it should be determined whether a received disc is a special disc. If the results indicate that the disc is a special disc, the transfer rate of the disc should be limited such that a normal drive operation is performed according to the deflection, eccentricity, and mass eccentricity.

If the deflection, eccentricity, and mass eccentricity of the disc increase, disturbances increase for which a focus and tracking control loop should compensate. Moreover, if the transfer rate of the disc increases, the rate of change of the disturbances increases and all servo operations become unstable. In particular, after a search or a layer jump operation, a focus and tracking control cannot start in a stable mode. Therefore, only when the speed of a spindle motor is limited to a predetermined value at which a normal servo operation is performed in accordance with the deflection, eccentricity, and mass eccentricity of the special disc can data be stably recorded on and reproduced from the special disc.

In order to limit the speed, an algorithm is used to determine whether a received disc is either a deflection disc, an eccentric disc, or a mass eccentric disc. However, according to algorithms used conventionally, the result of the determination varies according to a state of the servo. Also, since there is no algorithm appropriate to determine if the special disc is the disc deflection, there are many disc drive models which do not determine or recognize whether the disc is a deflection disc.

Figure 1A:
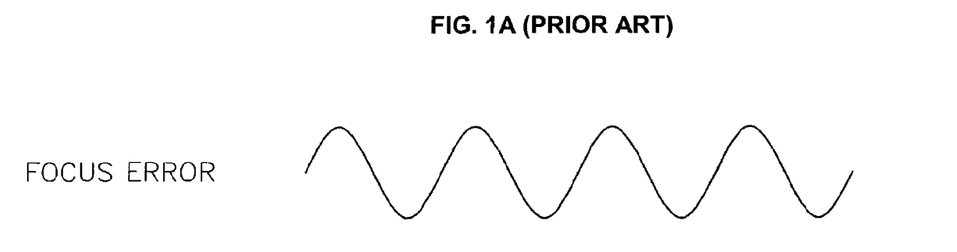
FIGS. 1A through 1C are, respectively, a waveform diagram of a focus error signal used in measuring disc deflection, a waveform diagram of a tracking error signal used in measuring disc eccentricity, and a block diagram showing the structure of a TZC signal generating apparatus.
Figure 1B:
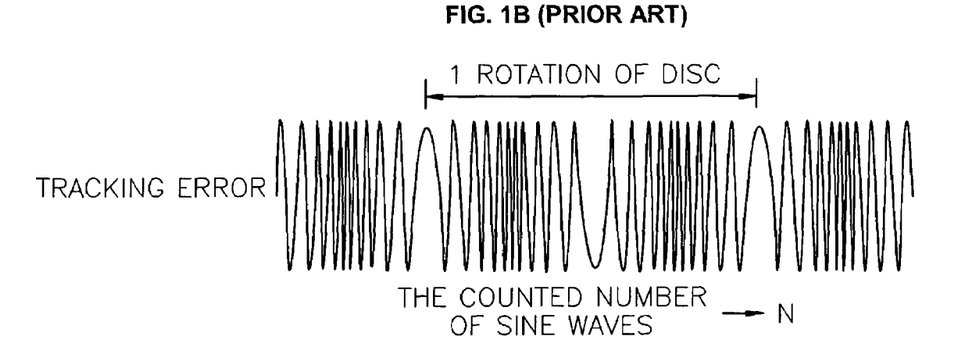
Figure 1C:
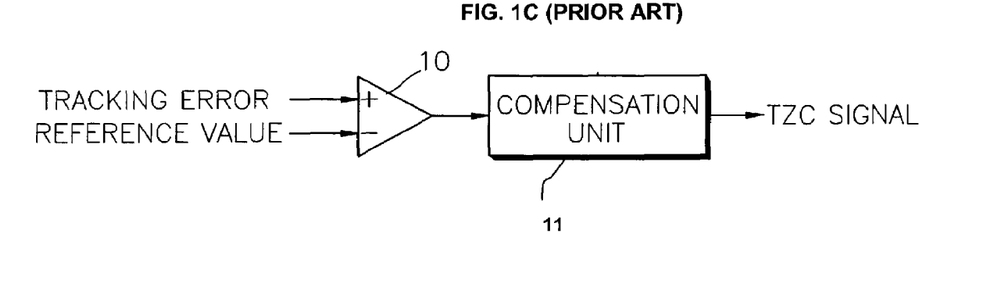

FIG. 1A shows a focus error signal used in measuring the deflection of a disc. The amplitude of this focus error signal is then used as data to determine whether the disc is the deflection disc. FIGS. 1B and 1C are, respectively, a waveform diagram of a tracking error signal used to generate a tracking zero cross (TZC) used in measuring disc eccentricity, and a TZC signal generating block. The tracking error signal of FIG. 1B is compared with a reference value in a comparison unit 10 of the TZC signal generating block of FIG. 1C. The result of the comparison is compensated in a compensation unit 11 so as to generate the TZC signal. Since the TZC signal is output as a sequence of pulses whenever a pickup (not shown) passes through one track, the number of this TZC pulses is calculated and used as data for determining whether the disc is the deflection disc.

Conventionally, determining whether a disc is the deflection disc, the eccentric disc, or the mass eccentric disc is performed in an initial lead-in operation. A microcomputer (not shown) normally drives a drive with automatic adjustment, and then determines the disc type by the following methods.

Deflection Disc:

For a constant focus control loop gain, a disc having a great deflection has a great focus disturbance, a deflection component which is not controlled is great, and the amplitude of the sine wave appearing in the focus error signal of FIG. 1A increases. Therefore, by measuring the amplitude of the focus error, it can be determined if the disc has a large deflection.

In order to increase the measuring resolution, the focus loop gain is reduced and the output of the focus error signal is increased.

In the prior art, the focus error signal is read by a microcomputer (not shown). If the obtained amplitude of the signal is greater than a predetermined value, it is determined that the received disc is the deflection disc. The greater the amplitude of the focus error signal, the greater deflection of the received disc, and therefore the maximum transfer rate of the disc is reduced. However, if the focus error signal is used to determine the disc deflection, the measuring reliability is degraded because the signal is greatly affected by noise. Therefore, in most disc drive models, this method is not used. Even when this method is used, the importance of the determining the disc deflection is minimized.

Eccentric Disc:

In a state where only focus control is performed, a track transverse signal as shown in FIG. 1B is a tracking error. Since the number of sine waves output during one disc rotation cycle varies with respect to the eccentricity of the disc, the eccentricity of the disc can be calculated by counting the number of pulses of the sine waves output during one disc rotation cycle. For this, the TZC signal, used to find the number of tracks passed in searching, is employed.

The eccentricity of the disc is obtained by multiplying the number of pulses of the sine wave output during one disc rotation cycle by (track pitch/2). Using the calculated eccentricity, it is determined whether the disc is the eccentric disc, and the speed of a spindle motor is limited according to the eccentricity. The prior art method for measuring disc eccentricity is widely used for many drives because it is more reliable than the method for measuring disc deflection.

Mass Eccentric Disc:

The mass eccentric disc presents a small eccentricity for a low transfer rate, but the eccentricity increases for a high transfer rate. Accordingly, when an algorithm for measuring disc eccentricity is used, if the number of pulses of the sine wave output during one disc rotation cycle at the low transfer rate is almost the same as that at the high transfer rate, the received disc is not the mass eccentric disc. If the difference in the number of pulses is great, the received disc is a mass eccentric disc. Here, according to the difference of the number of pulses, the maximum transfer rate is limited.

As described above, in the prior art, the disc deflection, the disc eccentricity, and the disc mass eccentricity are not directly measured. Instead, an algorithm is used which utilizes general characteristics. For instance, the general characteristics include that if the deflection, the eccentricity, and the mass eccentricity increase, the amplitude of the focus error increases, or the number of pulses of the sine waves increases during the output of a disc rotation frequency. The eccentricity algorithm has a relatively high accuracy and is used in most disc drive models, while the deflection algorithm has a low accuracy and a high probability of erroneous determination, and is rarely used. If the type of the special disc is not distinguished and the transfer rate is not appropriately lowered, the focus and tracking control loop becomes unstable and the performance of the disc drive degrades.

SUMMARY OF THE INVENTION

To solve the above and related problems, it is an object of the present invention to provide a disc type determining apparatus which measures the vibrations of a focus and tracking control loop and determines whether a disc is a deflection disc, an eccentric disc, or a mass eccentric disc using the measured vibrations, and efficiently adjusts the transfer rate of the disc.

It is another object of the present invention to provide a disc type determining method which measures the vibrations of a focus and tracking control loop, and using the measured vibrations, determines whether a disc is a deflection disc, an eccentric disc, or a mass eccentric disc, and efficiently adjusts the transfer rate of the disc.

Additional objects and advantages of the invention will be set forth in part in the description which follows and, in part, will be obvious from the description, or may be learned by practice of the invention.

To accomplish the above and other objects of the present invention, an embodiment of a disc type determining apparatus for use in a disc recording and reproducing apparatus in which vibrations generated by rotations of a disc occur in a focus and tracking control actuator, comprises an error gain adjusting unit which adjusts the amplitude of a focus and tracking error which occurs in the focus and tracking control loop in order to maintain a constant amplitude of the focus and tracking error; a loop gain adjusting unit which, in order to compensate for the gain difference of an actuator, compares the closed loop phase of the focus and tracking control loop and a predetermined reference closed loop phase, and maintains a constant gain of the focus and tracking control loop; a vibration measuring unit which measures vibrations using the error adjusted by the error gain adjusting unit and the loop gain adjusting unit, and the output of a controller which controls the focus and tracking error compensated by the adjusted error; and a disc type determining unit which extracts a predetermined signal for determining the type of the disc using the measured vibrations, measures the deflection, eccentricity, and mass eccentricity of the disc using the extracted signal, and determines whether the disc is a deflection disc, an eccentric disc, or a mass eccentric disc.

According to another embodiment of the present invention, a disc type determining method which determines the type of a disc using the vibration of a disc recording and reproducing apparatus in which vibrations generated by rotations of a disc occur in a focus and tracking control loop comprises adjusting the amplitude of the focus and tracking error which occurs in the focus and tracking control loop in order to maintain a constant amplitude of the focus and tracking error and outputting the adjusted focus and tracking error; compensating for the gain difference of an actuator by comparing the closed loop phase of the focus with tracking control loop and a predetermined reference closed loop phase, adjusting the gain of the focus and tracking control loop to be constant, and outputting the focus and tracking error; controlling the focus and tracking error of the disc which is compensated and whose amplitude is adjusted to be constant and gain of the focus and tracking loop whose actuator gain is adjusted, and calculating the vibrations; and extracting a predetermined signal for determining the type of the disc using the measured vibrations, measuring the deflection, eccentricity, and mass eccentricity of the disc using the extracted signal, and determining whether the disc is a deflection disc, an eccentric disc, or a mass eccentric disc.

BRIEF DESCRIPTION OF THE DRAWINGS

The above and other objects and advantages of the present invention will become more apparent and more readily appreciated by describing in detail embodiments thereof with reference to the accompanying drawings in which.

DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

In order to normally operate a special disc having a deflection, an eccentricity, and a mass eccentricity larger than those of a normal disc, either a learning algorithm should be applied to compensate for the deflection, eccentricity, and mass eccentricity, a disturbance observer (DOB) should be applied, or the spindle speed should be limited to a speed value causing a disturbance that can be controlled by a servo operation. At present, in most disc drives, a method of reducing the spindle speed by using a speed lowering algorithm is used to handle the special discs. In the speed lowering algorithm, the maximum speed value is limited according to the value of the deflection, eccentricity, and mass eccentricity, after it is determined whether a received disc is a deflection disc, an eccentric disc, or a mass eccentric disc.

In the present invention, in order to efficiently determine the special disc type and apply the speed lowering algorithm, the deflection, eccentricity, or mass eccentricity of the received disc is directly measured using a focus tracking error, and using the measured data, it is determined whether the received disc is a special disc. According to one embodiment of the present invention, since the deflection, eccentricity, and mass eccentricity can be more accurately measured, the speed lowering algorithm can be applied more systematically.

Figure 2:
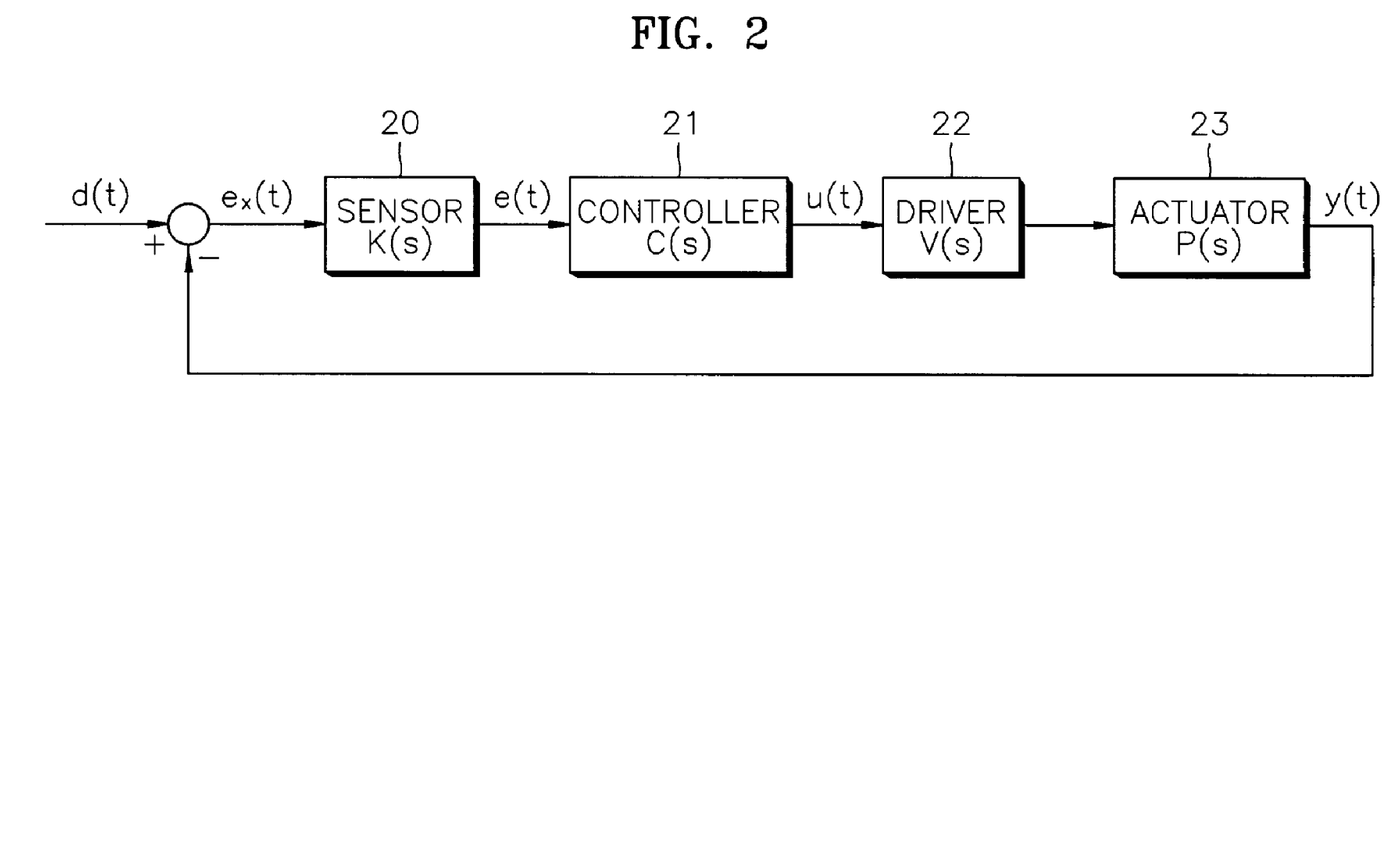
FIG. 2 is a block diagram showing a focus and tracking control loop.

FIG. 2 is a block diagram showing a focus and tracking control loop of an optical disc system according to an embodiment of the invention. The focus and tracking control loop of FIG. 2 comprises a sensor K(s) 20, a controller C(s) 21, a driver V(s) 22, and an actuator P(s) 23. The sensor K(s) 20 of an aspect of the invention comprises a photo diode (PD) (not shown), which detects a signal picked up from a disc and an RF chip (not shown) which amplifies the pickup signal and outputs a tracking and focus error e(t). After an extent to which the pickup (not shown) deviates from a fixed focus location or the center of a track, the vibration d(t) occurring in the optical disc drive of the optical system is detected by the photo diode (not shown), and the focus and tracking error e(t) is amplified with the RF chip gain and output. The controller C(s) 21 compensates for the focus and tracking error e(t) which is output from the sensor K(s) 20, and the output u(t) of the controller C(s) 21 is provided to the actuator P(s) 23 through the driver V(s) 22.

The vibration d(t) occurring in the optical disc drive of the optical system can be expressed by the sum of the vibration $e_x(t)$ which the loop cannot compensate and the vibration y(t) which the loop compensates as presented in the following equation 1-1. When the vibrations measuring apparatus of FIG. 3 is used, the vibration d(t) can be expressed as the following equation 1-2.

$$d(t) = e_x(t) + y(t) \quad (1\text{-}1)$$

$$d(s) = \frac{e(s)}{K(s)} + V(s)P(s)u(s) \quad (1\text{-}2)$$

Figure 3:
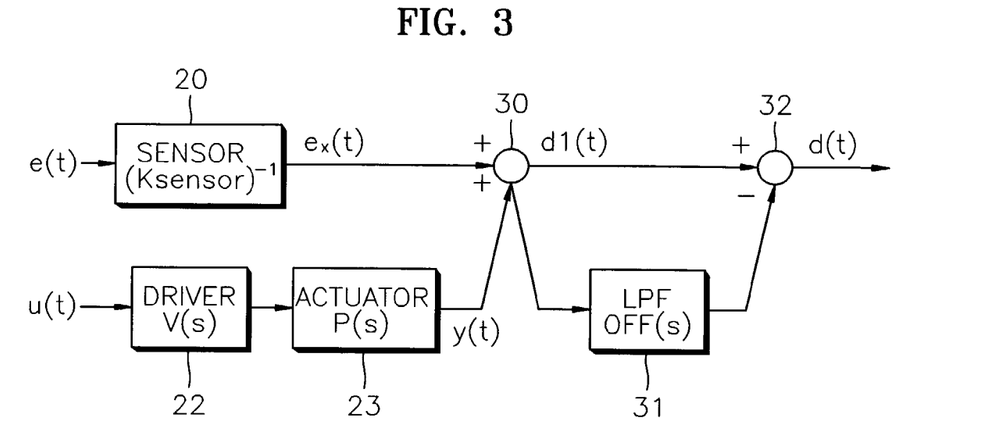
FIG. 3 is a block diagram showing the structure of a vibration measuring apparatus according to an embodiment of the invention.

FIG. 3 is a block diagram showing the structure of a vibration measuring apparatus according to an embodiment of the present invention. The vibration measuring apparatus comprises a sensor $K(s)^{-1}$ 20, the driver V(s) 22, the actuator P(s) 23, a first calculating unit 30, a low pass filter (LPF) OFF(s) 31, and a second calculating unit 32. Using the vibration measuring apparatus of FIG. 3, the vibration $e_x(t)$ which the control loop cannot compensate can be calculated with the focus and tracking error e(t) and the sensor $K(s)^{-1}$ 20. The vibration y(t) can be calculated with the control u(t), the driver V(s) 22, and the actuator P(s) 23. After LPF OFF(s) 31 removes an offset component from the calculated sum of two vibrations, the final vibration d(t) is output.

Figure 4:
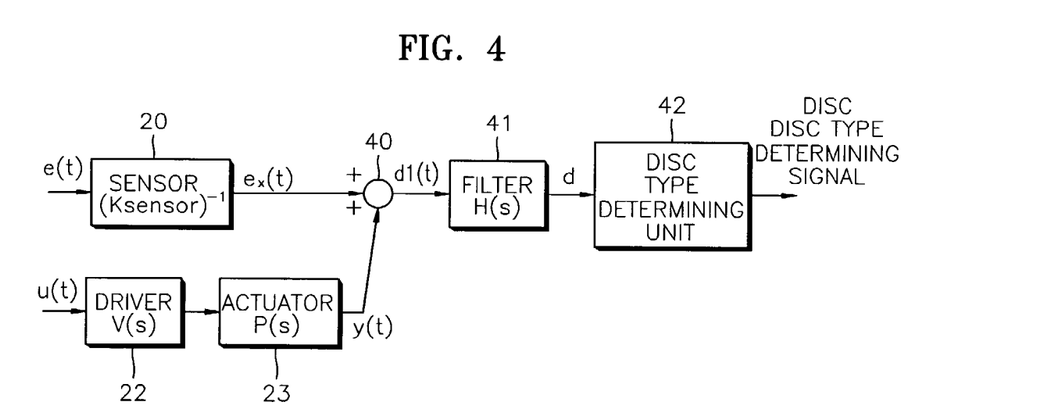
FIG. 4 is a block diagram of a disc type determining apparatus according to an embodiment of the present invention.

FIG. 4 is a block diagram of a disc type determining apparatus according to an embodiment of the present invention. In the device in FIG. 4, it is determined whether a disc is a deflection disc, an eccentric disc, or a mass eccentric disc after extracting a rotational frequency from a measured vibration d1(t). The disc type determining apparatus of FIG. 4 comprises the sensor $K(s)^{-1}$ 20 that measures the vibrations $e_x(t)$, the driver V(s) 22, the actuator P(s) 23, a summing unit 40, a filter H(s) 41 to filter a rotation frequency component output from the summing unit 40, and a disc type determining unit 42 that determines the type of the disc by comparing the filtered rotation frequency d(t) with a reference value. Also, though not shown in FIG. 4, the disc type determining apparatus further comprises a transfer rate adjusting unit (not shown) which adjusts the transfer rate of data read/recorded with respect to the disc according to the result of the disc type determining unit 42.

The operation of the vibrations measuring apparatus shown in FIG. 4 is divided into the following four parts for explanation:

1. calculation of vibration $e_x(t)$ which the control loop cannot compensate;
2. calculation of vibration y(t) which the control loop compensates;
3. calculation of vibration d(t); and
4. determining the type of a special disc and setting a transfer rate.

1. Calculation of Vibrations $e_x(t)$ which the Control Loop Cannot Compensate

The vibration $e_x(t)$ which the control loop cannot compensate is calculated after the amplitude of the focus and tracking error e(t) is made constant, and the gain of the sensor K(s) 20 is made constant. In order to accurately calculate the vibration $e_x(t)$, the changes in the reflection ratio of a disc should be considered.

The vibration $e_x(t)$ which the control loop cannot compensate can be calculated as e(t) $K(s)^{-1}$. The focus and tracking error e(t) is a value measured in the optical system. The second $K(s)^{-1}$ 20 amplifies the focus and tracking error e(t), adjusts the gain of the focus and tracking error e(t) to be constant value, and outputs the focus and tracking error $e_x(t)$. The focus error is output as an S curve through the sensor $K(s)^{-1}$ 20, which controls the gain of the focus and tracking error e(t), and the tracking error is output as a sine wave. Since adjusting the gain of the focus error and the gain of a tracking error e(t) is possible only in a linear interval, the gain of the focus error and the gain of the tracking error that are adjusted in sensor $K(s)^{-1}$ 20 can be calculated in a linear interval (2F) on the S curve of the focus error and the track pitch (P) of the sine wave of the tracking error, which is presented as the following equation 2:

$$\text{focus error gain} = \frac{A\pi}{2F} \quad (2)$$

$$\text{tracking error gain} = \frac{2\pi A}{P}$$

in which A is the amplitude of the focus and tracking error e(t), F is the focal length in a linear interval, and P is the track moving distance in a linear interval.

Sensor $K(s)^{-1}$ 20 is modeled to a second LPF, the DC gain of which is the gain of the Ksensor 10. Since the limit of the LPF is tens or hundreds of Hz, which is greater than the control loop band, it can be approximated to $K(s)^{-1}$.

If there are changes in a laser power and/or the disc reflection ratio, the amplitude of the tracking error changes. Accordingly, the gain of the sensor $K(s)^{-1}$ 20 changes. However, in order to accurately calculate the vibration $e_x(t)$, the amplitude of the focus and tracking error e(t) is adjusted to be constant so that the gain of sensor $K(s)^{-1}$ 20 is always constant despite changes in the laser power and the disc reflection ratio.

Since each block shown in FIG. 4 is modeled as a nominal model (reference model) using nominal parameters, a modeling error may occur due to the gain change of sensor $K(s)^{-1}$ 20.

The elements which affect the gain change of the sensor $K(s)^{-1}$ 20 include a change of a linear interval (2F) in the S curve of the focus error, a change of the track pitch (P) of the tracking error, and a change in the amplitude of the focus and tracking error e(t) caused by changes in laser power or disc reflection ratio. The linear interval (2F) in the S curve of the focus error is determined by the laser wavelength, or a numerical aperture. However, since the wavelength is affected by a temperature change, etc., while the numerical aperture does not change, the respective linear intervals (2F) in the S curve of the focus error may be different from others. As for the track pitch (P) of the tracking error, a change in the track pitch in a CD is relatively greater than that in a DVD disc, and except a marginal disc, the track pitch changes are within about 10%.

Change in the amplitude (A) of the focus and tracking error e(t) due to changes in the laser power and the disc reflection ratio can be maintained constant by adjusting the gain parameters of sensor $K(s)^{-1}$ 20. Thus, the gain of sensor $K(s)^{-1}$ 20 may differ in each drive, and to compensate for variation, the gain control of the sensor $K(s)^{-1}$ 20 which maintains the constant amplitude (A) of the focus tracking error is performed. Then, when the amplitude (A) of the focus and tracking error is maintained to be constant, the gain of sensor $K(s)^{-1}$ 20 changes only by a laser wavelength by temperature or track pitch. Since the change in the laser wavelength or the track pitch is relatively small, the change of the gain of sensor $K(s)^{-1}$ 20 is also small.

The focus and tracking error signal e(t) is amplified by the sensor $K(s)^{-1}$ 20 with a gain adjustment as described above, and is output. A value obtained by dividing the focus and tracking error signal e(t) by the sensor gain (Ksensor 10) is then calculated and output as the vibration $e_x(t)$.

2. Calculation of Vibrations y(t) which the Control Loop compensates

The sensitivity of the actuator P(s) 23 is adjusted by adjusting the gain of the focus and tracking control loop. Thus, the vibration y(t) for which the control loop compensates is calculated. In order to accurately calculate the vibration y(t), changes in the sensitivity of actuator P(s) 23 should be considered.

The vibration y(t), which is output from the actuator P(s) 23, is calculated as u(t)V(s)P(s), where u(t) is the output value of the controller C(s) 21 and can be measured in the optical system. The drive V(s) 22 can be accurately modeled by a first order low pass filter LPF. The actuator P(s) 23 is modeled as a second order linear system, using DC sensitivity, a resonance frequency, and a Q sensitivity.

However, in calculating the vibration y(t), changes in the sensitivity of the actuator P(s) 23 should be considered, and for this, a loop gain adjusting algorithm is used. Through the loop gain adjusting algorithm by which the loop gain is adjusted to be constant, the actuator P(s) 23 can be known by how much the gain changes compared to a nominal model. Accordingly, using the loop gain adjusting algorithm, the actuator P(s) 23 can be accurately modeled. Thus, by modeling the actuator P(s) 23 in consideration of the changes in the sensitivity of the actuator P(s) 23, the vibration y(t) can be accurately calculated.

Figure 5:
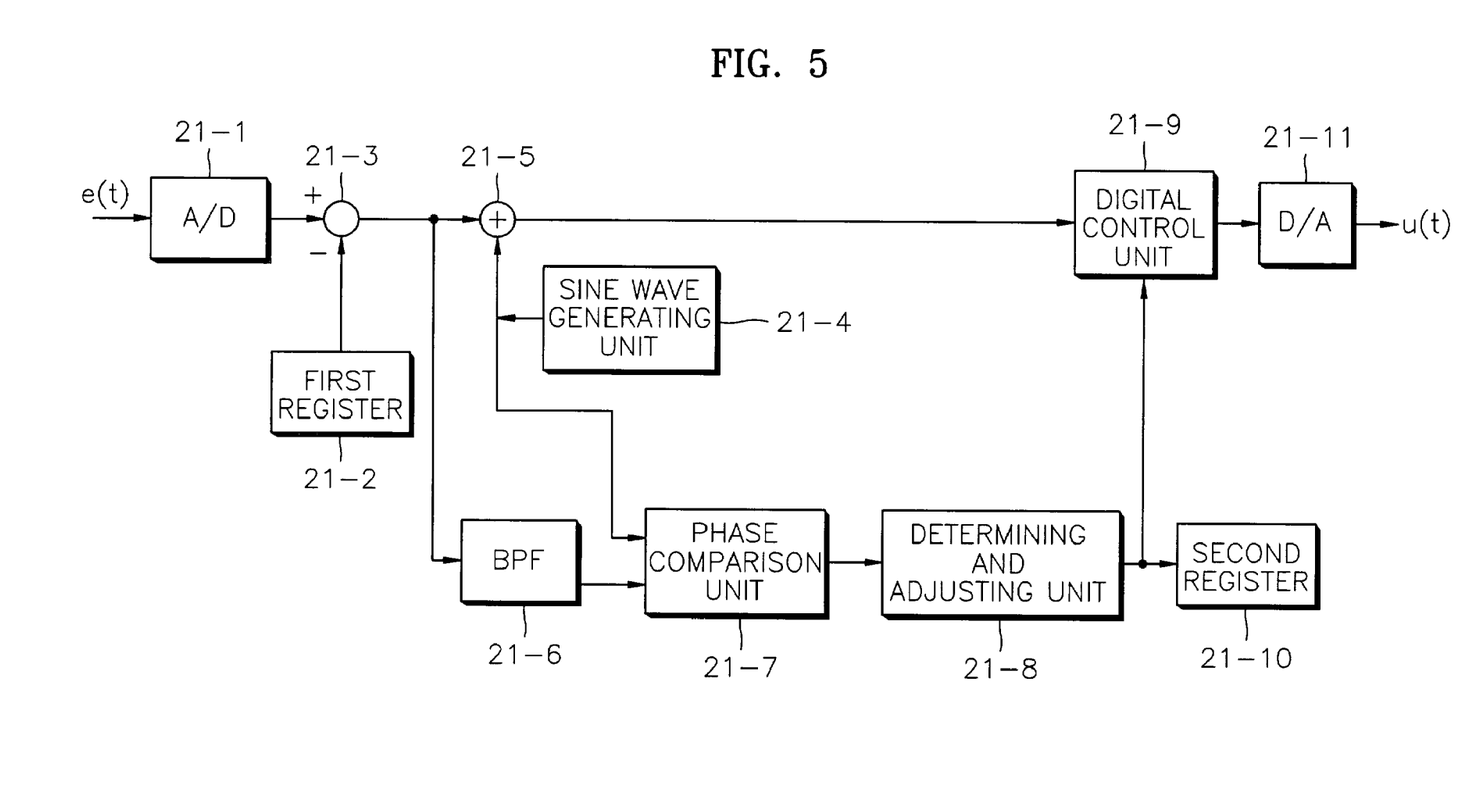
FIG. 5 is a diagram showing a focus and tracking gain adjusting algorithm to adjust the sensitivity change of the actuator.

FIG. 5 is a diagram to explain the focus and tracking gain adjusting algorithm for automatically adjusting the sensitivity changes of the actuator P(s) 23. FIG. 5 shows the changes in the sensitivity of actuator P(s) 23 according to the adjusted gain of controller C(s) 21. By considering the result of adjusting the gain of the focus and tracking control loop in the modeling of the actuator P(s) 23, the reliability of measurement even for a modeling error that differs in each drive can be improved.

In order to adjust the gain of the focus and tracking control loop, the apparatus shown in FIG. 5 comprises an A/D converter 21-1, a first register 21-2, a first calculating unit 21-3, a sine wave generating unit 21-4, a second calculating unit 21-5, a band pass filter BPF 21-6, a phase comparison unit 21-7, a determining and adjusting unit 21-8, a digital control unit 21-9, a second register 21-10, and a D/A converter 21-11. The A/D converter 21-1 converts the focus and tracking signal e(t), which is output from sensor K(s) 20 and the amplitude of which is adjusted to be constant, into a digital signal. The first register 21-2 adjusts an offset since, even when a drive does not perform a focus and tracking operation, there may be an offset in a focus and tracking error on a circuit. To remove the offset from the error signal, the offset of each error signal e(t) is measured before performing the focus and tracking control, and is stored in the first register 21-2.

The first calculating unit 21-3 removes the offset signal stored in the first register 21-2 from the output signal e(t) of sensor K(s) 20 which has been converted into a digital form.

The sine wave generating unit 21-4 generates a sine wave to adjust the gain of the focus and tracking control loop. The sine wave generating unit 21-4 usually selects and outputs one sine wave from the sine waves with frequencies of 687 Hz, 1.38 kHz, 2.76 kHz, and 5.51 kHz. The amplitude of the provided sine wave can be adjusted.

The second calculating unit 21-5 adds a sine wave having a predetermined frequency to the focus and tracking error received from the first calculating unit 21-3. The sine wave disturbance having a predetermined frequency added to the focus and tracking error travels around the focus and tracking control loop and appears again in a focus and tracking error in the next sample.

The BPF 21-6 extracts only the sine wave disturbance components from the focus and tracking error which has traveled around the focus and tracking control loop. The focus and tracking error which is input to the BPF 21-6 is delayed for a phase of the closed loop of the provided frequency, because the focus and tracking error traveled for a loop along the focus and tracking control loop.

The phase comparison unit 21-7 compares the phase of the sine wave provided from the sine wave generating unit 21-4 with the signal output from the BPF 21-7 and obtains a phase difference between them. The determining and adjusting unit 21-8 compares the phase difference output from the phase comparison unit 21-7 with the phase difference of a nominal model (i.e., a reference phase difference). According to the compared phase differences, the determining and adjusting unit 21-8 adjusts the DC gain of the digital control unit 21-9. Specifically, if the gain of the current loop is greater than the gain of the nominal loop, the determining and adjusting unit 21-8 reduces the gain of the digital control unit 21-9. However, if the gain of the current loop is smaller than the gain of the nominal loop, the determining and adjusting unit 21-8 increases the gain of the digital control unit 21-9 so as to maintain a constant gain of the focus and tracking control loop. This adjustment of the loop gain is repeatedly performed until the closed loop phase of the focus and tracking control loop becomes the same as the closed loop phase of the nominal loop.

The second register 21-10 stores the result of the final loop gain adjustment. When vibrations are measured, by reading the result value of the loop gain adjusting stored in the second register 21-10 and adjusting the DC gain of actuator P(s) 23 modeling, changes in the sensitivity of the actuator P(s) 23 are compensated.

The output of the digital control unit 21-9 is converted into an analog signal through the D/A 21-11 and is output to the driver V(s) 22. Finally, the output u(t) of controller C(s) 21 passes through driver V(s) 22 and actuator P(s) 23, the DC gain of which is compensated, and becomes the vibration y(t) which the control loop compensates.

3. Calculation of Vibration d(t)

With reference to FIG. 3, the first calculating unit 30 sums the vibration $e_x(t)$, which the control loop cannot compensate, with the vibration y(t), which the control loop compensates. The LPF OFF(s) 31 removes the DC component of the vibrations d1(t). The LPF OFF(s) 31 includes a DC LPF and filters the signal d1(t). If the LPF OFF(s) 31 is implemented by a computer program, an average value of 64 samples and 128 samples of the output d1(t) of the first calculating unit 30 is obtained, and an offset component of the signal d1(t) is determined. After removing the offset component of the signal d1(t), the output signal d(t) is output. Accordingly, the final vibration d(t) is d1(t)from which the offset component is removed.

4. Determining the Type of a Special Disc and Setting a Transfer Rate

Figure 6A:
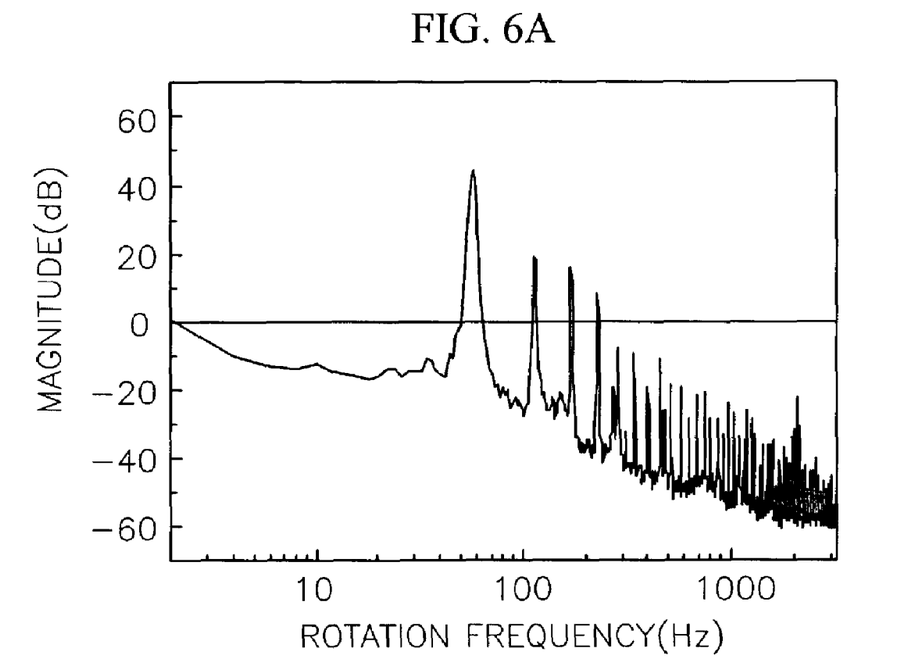
FIGS. 6A and 6B are waveform diagrams showing embodiments of a vibration measuring method according to the present invention.
Figure 6B:
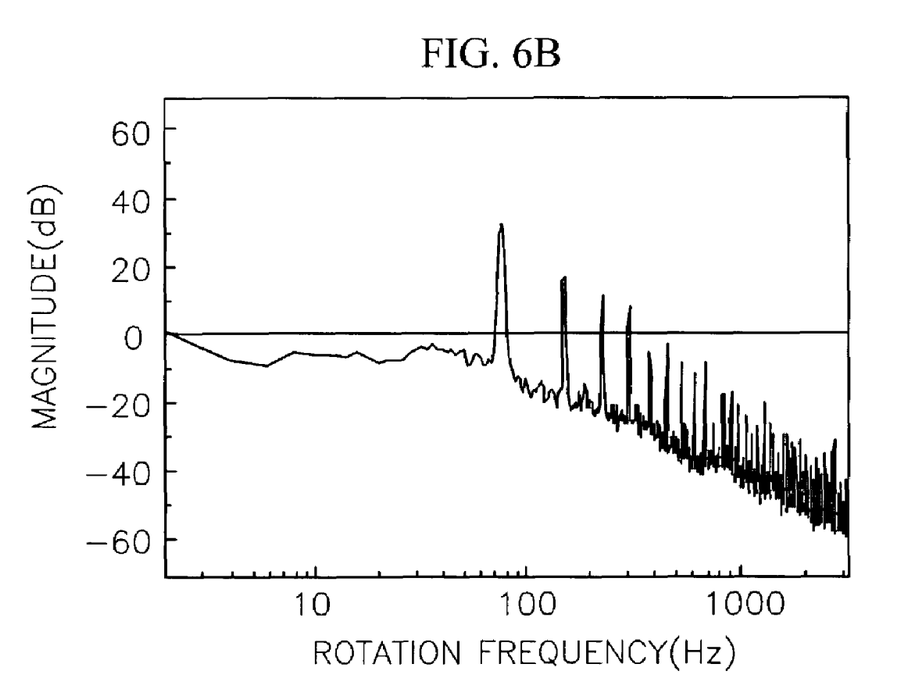

In FIG. 4, the filter H(s) 41 filters only the first harmonic component d of a disc rotation frequency from the synthesized signal d1(t). FIG. 6A shows data obtained by measuring the focus and tracking vibrations of a 400 µm deflection disc. FIG. 6B shows data obtained by measuring focus and tracking vibrations of a 50 µm eccentricity disc. At the disc rotation frequency, the focus and tracking vibrations are the largest, and at the harmonic component of the disc rotation frequency, the vibrations is relatively large. Since the deflection, eccentricity, and mass eccentricity of the disc is determined by the size of the disc rotation frequency component, the first harmonic d of the vibration d1(t) is extracted by the filter H(s) 41, which filters only the disc rotation frequency component from the measured vibration.

The disc type determining unit 42 measures the deflection, eccentricity, and mass eccentricity from the rotation frequency output from the filter H(s) 41, compares the measured values with reference values and determines whether the disc is a deflection, eccentric, or mass eccentric disc. The deflection, eccentricity, and mass eccentricity of the disc is the same as the vibrations of the disc rotation frequency among vibrations occurring in the drive. That is, the deflection is given by the disc rotation frequency component of focus vibration d1(t) measured by a focus error signal and a focus controller output, the disc eccentricity is given by the disc rotation frequency component of tracking vibration d1(t) measured by a tracking error signal and a tracking controller output, and the disc mass eccentricity is given by a difference between the eccentricity of a disc at a low transfer rate and the eccentricity of a disc at a high transfer rate.

If the measured deflection, eccentricity, and mass eccentricity are greater than the reference values, the disc is determined to be a deflection disc, an eccentric disc, and a mass eccentric disc. The proposed reference values are set differently in each disc drive. The maximum transfer rate of the disc is set according to the size of the deflection and the eccentricity. Also, the maximum transfer rate is limited according to the size of the disc mass eccentricity.

Figure 7:
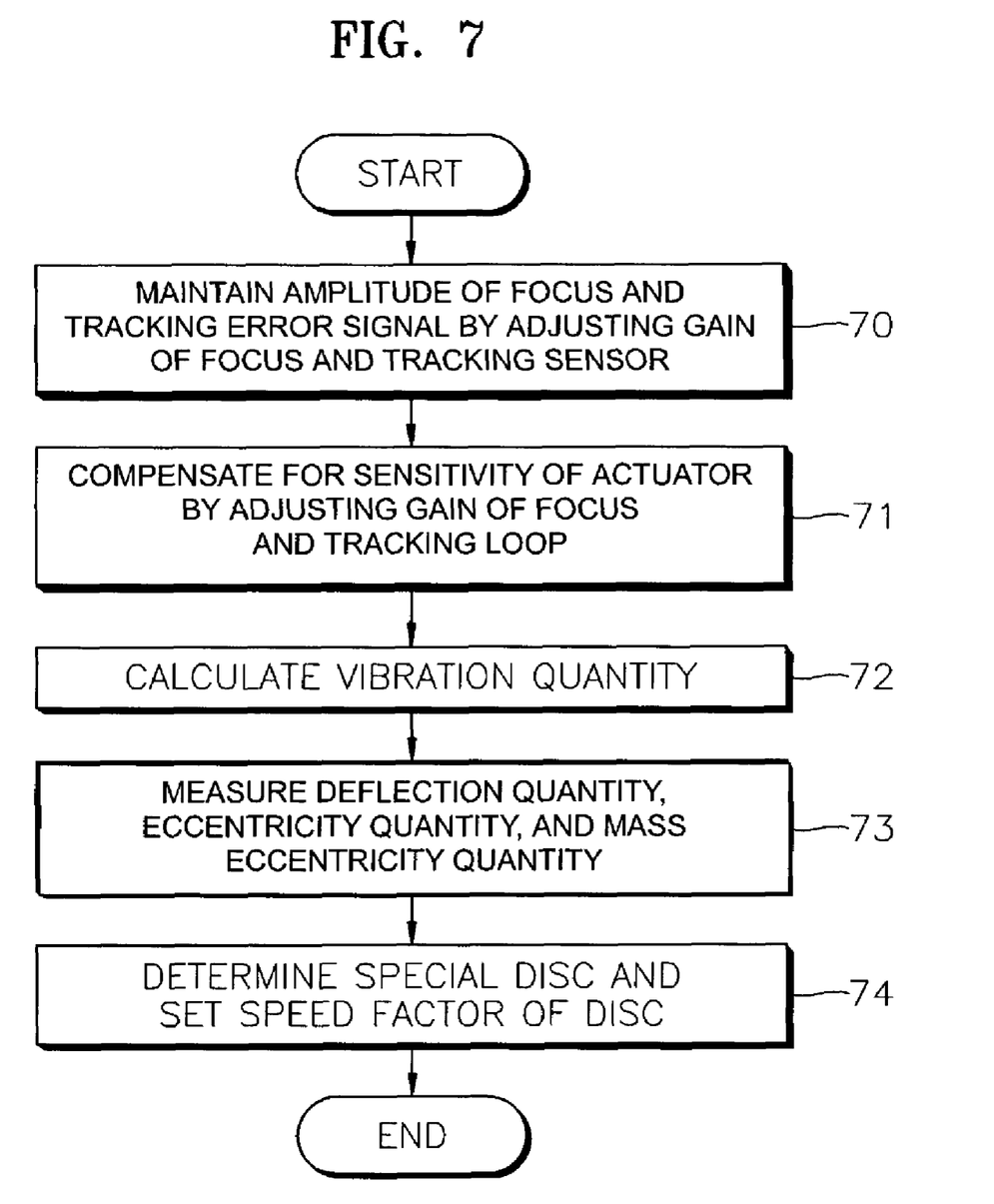
FIG. 7 is a flowchart showing an operation of a disc type determining method according to an embodiment of the present invention.

FIG. 7 is a flowchart showing an operation of a disc type determining method according to an embodiment of the present invention. The method includes adjusting the gain parameter of the focus and tracking sensor K(s) 20 so that the amplitude of the focus and tracking error signal e(t) is maintained constant (operation 70) and, using the result of adjusting the gain of the focus and tracking control loop constant, the DC sensitivity of the actuator P(s) 23 is compensated (operation 71) and the vibration is calculated (operation 72). The deflection, eccentricity, and mass eccentricity are measured (operation 73). The type of a special disc is determined and the transfer rate of the disc is set (operation 74).

In operation 70, in order to maintain the constant amplitude of the focus and tracking error e(t), the gain of the sensor K(s) 20 is adjusted. In order to adjust the gain of sensor K(s) 20, the gain of the focus error signal, which is output as an S curve, is adjusted by a value obtained by dividing the amplitude in a linear interval by the amplitude in a focus linear interval. The gain of the tracking error signal which is output as a sine wave, is adjusted by a value obtained by dividing the amplitude in a linear interval by a track pitch.

In order to compensate the sensitivity of actuator P(s) 23 using the focus and tracking signal, the gain of which is adjusted, the gain of the focus and tracking control loop is adjusted (operation 71). Referring to FIG. 5, in order to adjust the gain of the focus and tracking control loop, the sine wave for adjusting the control loop gain is added to the focus and tracking error signal. Then, by obtaining the phase difference between the sine wave disturbance frequency component of the focus and tracking error signal, which has traveled for one loop within the focus and tracking control loop, and the provided sine wave disturbance frequency, the closed loop phase of the focus and tracking control loop is calculated. By comparing the obtained closed control loop phase with the nominal closed loop phase (a reference phase), the gain of the focus and tracking controller C(s) 21 is adjusted until the two phases become equal to one another. Based on the result of adjusting the focus and tracking control loop gain, the gain of actuator P(s) 23 is accurately modeled.

By adjusting the gains of the sensor K(s) 20 and the actuator P(s) 23, the sensor K(s) 20 and the actuator P(s) 23 are accurately modeled, and then the disc drive vibrations is calculated (operation 72). A value obtained by dividing the focus and tracking error signal e(t), which is adjusted by adjusting the gain of sensor K(s) 20, by the sensor gain Ksensor, and the value y(t) output from actuator P(s) 23, which is obtained after the output of controller C(s) 21 u(t) is input to actuator P(s) 22 through driver V(s) 22, are summed and the disc drive vibration d1(t) is calculated.

In operation 73, from the calculated vibration d1(t), the deflection, eccentricity, and mass eccentricity of the disc are obtained. The filter H(s) 41 removes only the first harmonic component d of the calculated vibration d1(t), since the deflection, eccentricity, and mass eccentricity of the disc are determined by the size of the disc rotation frequency component. The first harmonic component d of the vibrations d1(t) is removed by the filter H(s) 41 that filters only the disc rotation frequency component from the measured vibrations. The disc type determining unit 42 measures the deflection, eccentricity, and mass eccentricity of the disc from the rotation frequency output from the filter H(s) 41. The deflection, eccentricity, and mass eccentricity of the disc is the same as the vibrations of the disc rotation frequency among vibrations occurring in the drive. Specifically, the deflection is given by the disc rotation frequency component of the focus vibration measured by the focus error signal and the focus controller output. The eccentricity is given by the disc rotation frequency component of the tracking vibrations measured by the tracking error signal and the tracking controller output. The mass eccentricity is given by the difference between eccentricity of the disc at the low transfer rate and the eccentricity of the disc at the high transfer rate.

In operation 74, according to the measured deflection, eccentricity, and mass eccentricity, the type of the special disc is determined, and the transfer rate of the disc is set. If the measured deflection, eccentricity, and mass eccentricity are greater than reference values, the disc type determining unit 42 determines the special disc as being a deflection disc, an eccentric disc, or a mass eccentric disc. The proposed reference values are set differently in each drive. According to the size of the deflection and the eccentricity, the maximum transfer rate of the disc is determined, and according to the size of the mass eccentricity that is the difference between the eccentricity of the disc measured at a low transfer rate and the eccentricity of a disc measured at a high transfer rate, the maximum transfer rate is limited.

According to the present invention as described above, the deflection, eccentricity, and mass eccentricity are directly measured so as to reduce errors in determining the type of a special disc. In particular, the present invention provides an appropriate algorithm to efficiently determined a deflection disc. Also, because of the reliability of the measured data, the transfer rate of the disc can be efficiently adjusted. In the prior art, due to errors in determining the disc type and low measured data reliability, the transfer rate set up according to the size of the deflection, eccentricity, and mass eccentricity is performed globally. However, according to the present invention, the transfer rate set up is divided into many sub-steps according to the sizes of the deflection, eccentricity, and mass eccentricity of the disc, and thus, the transfer rate of the disc can be set to be supported by the servo such that the performance of the disc drive improve.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A disc type determining apparatus usable in a disc recording and/or reproducing apparatus in which vibrations generated by rotations of a disc occur in a focus and tracking control actuator, the disc type determining apparatus comprising:
    an error gain adjusting unit which adjusts an amplitude of a focus and tracking error which occurs in a focus and tracking control loop, in order to maintain the amplitude of the focus and tracking error constant;
    a loop gain adjusting unit which, in order to compensate for a gain difference of the actuator, compares a closed loop phase of the focus and tracking control loop and a predetermined reference closed loop phase, and maintains a gain of the focus and tracking control loop constant using the comparison;
    a vibration measuring unit which measures vibrations using an error adjusted by the error gain adjusting unit and the loop gain adjusting unit, and an output of a controller which controls the focus and tracking error compensated by the adjusted focus and tracking error; and
    a disc type determining unit which determines a type of the disc, the disc type determining unit to extract a predetermined signal from the measured vibrations, measures a deflection, an eccentricity, and a mass eccentricity of the disc using the extracted predetermined signal, and identifies the disc as being one of a deflection-type disc, an eccentric-type disc, and a mass eccentric-type disc.

2. The apparatus of claim 1, further comprising a transfer rate adjusting unit which adjusts a transfer rate for data to reproduced and/or recorded with respect to the disc according to the determined disc type.

3. The apparatus of claim 1, wherein the error gain adjusting unit adjusts a gain of the focus error by the following equation:

$$\text{focus error gain} = \frac{A\pi}{2F},$$

where A is the amplitude of the focus and tracking error, and F is the focal length in a linear interval.

4. The apparatus of claim 1, wherein the error gain adjusting unit adjusts a gain of the tracking error by the following equation:

$$\text{tracking error gain} = \frac{2\pi A}{P},$$

where A is the amplitude of the focus and tracking error and P is the track pitch.

5. The apparatus of claim 1, wherein the loop gain adjusting unit comprises:
    a sine wave generating unit which generates a predetermined sine wave to adjust the loop gain;
    a phase signal processing unit which outputs the closed loop phase by comparing a sine wave disturbance in a digitally converted focus and tracking error signal and a phase of a provided sine wave; and
    a gain adjusting unit which compares the closed loop phase and a nominal closed loop phase so as to adjust the gain of the focus and tracking control loop to be at a constant level, and based on the adjusted result, sets the gain of the actuator.

6. The apparatus of claim 5, wherein the phase signal processing unit comprises:
    a disturbance extracting unit which extracts only the sine wave disturbance from the digitally converted focus and tracking error signal which is fed back from the focus and tracking control loop; and
    a phase comparison unit which outputs a phase difference obtained by comparing the output of the disturbance extracting unit with the phase of the provided sine wave.

7. The apparatus of claim 5, wherein the gain adjusting unit adjusts a gain of the controller so that the gain becomes the nominal phase difference, and compensates the same gain of the actuator as the adjusted gain of the controller.

8. The apparatus of claim 1, wherein the vibration measuring unit comprises:
    a first vibration measuring unit which measures a first vibration by dividing the focus and tracking error by the sensor gain so as to produce the error adjusted by the error gain adjusting unit and the loop gain adjusting unit;
    a second vibration measuring unit which measures a second vibration from the output signal of the focus and tracking control loop containing the actuator, the gain difference of which is compensated; and an offset adjusting unit which synthesizes the first vibration and the second vibration, obtains an average value of the synthesized signal for a predetermined time, and adjusts an offset of the synthesized signal using the obtained average value.

9. The apparatus of claim 8, wherein the offset adjusting unit comprises a filtering unit which filters the synthesized signal within a predetermined band.

10. The apparatus of claim 1, wherein the disc type determining unit comprises:
a frequency extracting unit which extracts a first harmonic component of the disc from the measured vibration; and
a disc type determiner which compares the first harmonic component with a predetermined reference value and to identify the disc as being one of the deflection-type disc, the eccentric-type disc, and the mass eccentric-type disc.

11. A disc type determining method which determines a type of a disc using the vibration of a disc recording and reproducing apparatus in which vibrations generated by rotations of a disc occur in a focus and tracking control loop, the disc type determining method comprising:
adjusting an amplitude of a focus and tracking error which occurs in the focus and tracking control loop so as to be constant and outputting the adjusted focus and tracking error having the constant amplitude;
compensating for a gain difference of an actuator by comparing a closed loop phase of the focus with tracking control loop and a predetermined reference closed loop phase, adjusting a gain of the focus and tracking control loop to be constant using the gain difference, and outputting the compensated focus and tracking error;
controlling the compensated focus and tracking error of the disc and the adjusted gain of the focus and tracking loop, and calculating the vibrations; and
extracting a predetermined signal from the measured vibrations, measuring a deflection an eccentricity, and a mass eccentricity of the disc using the extracted predetermined signal, and determining the disc as being one of a deflection-type disc, an eccentric-type disc, and a mass eccentric-type disc.

12. The method of claim 11, further comprising adjusting a transfer rate of data being reproduced and/or recorded with respect to the disc according to the determined disc type.

13. The method of claim 11, wherein, in the adjusting the amplitude, a gain of the focus error signal which is output as an S curve is adjusted by a value obtained by dividing the amplitude in a linear interval by a focus in linear interval.

14. The method of claim 11, wherein, in the adjusting the amplitude, a gain of the tracking error signal which is output as a sine wave is adjusted by a value obtained by dividing the amplitude in a linear interval by a track pitch.

15. The method of claim 11, wherein compensating for the gain difference further comprises:
extracting a sine wave disturbance from a focus and tracking error signal to which the sine wave was previously input;
outputting the closed loop phase by comparing the sine wave disturbance extracted from the focus and tracking error signal and the phase of the provided sine wave; and
outputting a control signal to adjust the gain of the focus and tracking control loop by comparing the closed loop phase with a nominal closed loop phase, and outputting the control signal as the gain adjusting signal of the actuator.

16. The method of claim 15, wherein in outputting a control signal, the gain of the focus and tracking control loop is adjusted so that the gain is the same as a nominal closed loop phase, and the gain of the actuator is compensated to be the same as the adjusted gain.

17. The method of claim 11, wherein the controlling the focus and tracking error further comprises:
measuring a first vibration by dividing the adjusted focus and tracking error signal by the sensor gain;
measuring a second vibration from the output signal of the focus and tracking control loop containing the actuator, the gain difference of which was compensated; and
synthesizing the first vibration and the second vibration, obtaining an average value of the synthesized signal for a predetermined time, and adjusting an offset of the synthesized signal using the obtained average value.

18. The method of claim 17, wherein the synthesizing the first vibration and second vibration further comprises filtering the synthesized signal within a predetermined band.

19. The method of claim 11, wherein the extracting the predetermined signal further comprises:
extracting a first harmonic component of the vibration using the measured vibration; and
comparing the first harmonic component with a predetermined reference value and determining based upon the comparison that the disc is one of the deflection-type disc, the eccentric-type disc, and the mass eccentric-type disc.

20. A recording and/or reproducing apparatus to record and/or reproduce data with respect to a disc, comprising:
a recording and/or reproducing head to transfer the data between the disc and the recording and/or reproducing apparatus as a spindle rotates the disc;
a sensor to detect a focus and tracking error from the disc and to output a focus and tracking error signal;
an actuator to actuate the optical head;
a driver to drive the actuator;
a controller to control the driver using a control signal and to control the rotation of the spindle;
a vibration detection unit which uses the focus and tracking error output by the sensor and the control signal output by the controller to determine a vibration of the disc rotated by the spindle; and
a transfer rate adjusting unit that adjusts a transfer rate of the disc based on a comparison between a rotation frequency component of the determined vibration and a reference value, the comparison being used to make a determination as to a disc type so that the transfer rate of the disc is adjusted based on the determined disc type,
wherein the sensor, the controller, the driver, and the actuator form a closed focus and tracking feed back loop to which the vibration of the disc is applied.

21. The recording and/or reproducing apparatus of claim 20, wherein the vibration detection unit detects the vibration according to the following formula:

$$d(s) = \frac{e(s)}{K(s)} + V(s)P(s)u(s),$$

d(s) is the vibration to be calculated represented in a frequency domain, e(s) is the focus and tracking error output by the sensor represented in the frequency domain, K(s) is a gain of the sensor represented in the frequency domain, V(s) is the actuator represented in the frequency domain, P(s) is the actuator represented in the frequency domain, and u(s) is the control signal represented in the frequency domain.

22. The recording and/or reproducing apparatus of claim 20, wherein the sensor has a gain such that an amplitude of the focus and tracking error is constant.

23. The recording and/or reproducing apparatus of claim 20, wherein the controller further comprises a loop gain adjusting unit which, in order to compensate for a gain difference of the actuator, compares a closed loop phase of the focus and tracking control loop and a predetermined reference closed loop phase, and maintains a loop gain of the focus and tracking control loop constant using the comparison.

24. The recording and/or reproducing apparatus of claim 20, further comprising a transfer rate adjusting unit which uses the determined vibration to adjust the transfer rate for the data transferred between the disc and the recording and/or reproducing apparatus.

25. The recording and/or reproducing apparatus of claim 24, wherein:
the transfer rate adjusting unit comprises a disc type determining unit which analyzes the determined vibration and categorizes the disc as being one of a deflection-type disc, an eccentricity-type disc, and a mass eccentricity-type disc so as to determine the disc type, and the transfer rate adjusting unit adjusts the transfer rate according to the determined disc type.

26. A recording and/or reproducing apparatus to record and/or reproduce data with respect to a disc, comprising:
an recording and/or reproducing head to transfer the data between the disc and the recording and/or reproducing apparatus as a spindle rotates the disc;

a sensor to detect a focus and tracking error from the disc and to output a focus and tracking error signal;

an actuator to actuate the optical head;

a driver to drive the actuator;

a controller to control the driver using a control signal and to control the rotation of the spindle;

a vibration detection unit which uses the focus and tracking error output by the sensor and the control signal output by the controller to determine a vibration of the disc rotated by the spindle; and a transfer rate adjusting unit which uses the determined vibration to adjust a transfer rate for the data transferred between the disc and the recording and/or reproducing apparatus, the transfer rate adjusting unit comprising a disc type determining unit which analyzes the determined vibration and categorizes the disc as being one of a deflection-type disc, an eccentricity-type disc, and a mass eccentricity-type disc so as to determine the disc type and a filter which analyzes the calculated vibration and extracts a harmonic of the calculated vibration, the transfer rate adjusting unit adjusting the transfer rate according to the determined disc type;

wherein the sensor, the controller, the driver, and the actuator form a closed focus and tracking feed back loop to which the vibration of the disc is applied; and wherein the disc type determining unit analyzes the extracted harmonic to determine the disc type.

27. The recording and/or reproducing apparatus of claim 26, wherein:
the deflection-type disc is determined using a focus error component of the focus and tracking error signal, the eccentricity-type disc is determined using a tracking error component of the focus and tracking error signal, and the mass eccentricity-type disc is determined using a difference in eccentricities at low and high transfer rates.

28. The recording and/or reproducing apparatus of claim 23, wherein the loop gain adjusting unit comprises:
a sine wave generating unit which generates a predetermined sine wave to adjust the loop gain;

a phase signal processing unit which outputs the closed loop phase by comparing a sine wave disturbance in the focus and tracking error signal and a phase of a provided sine wave; and a gain adjusting unit which compares the closed loop phase and a nominal closed loop phase so as to adjust the loop gain to be at a constant level, and based on the adjusted result, sets the gain of the actuator.

29. The recording and/or reproducing apparatus of claim 28, wherein the phase signal processing unit comprises:
a disturbance extracting unit which extracts the sine wave disturbance from the focus and tracking error signal which is fed back from the focus and tracking control loop; and a phase comparison unit which outputs a phase difference obtained by comparing the output of the disturbance extracting unit with the phase of the provided sine wave.

30. The recording and/or reproducing apparatus of claim 29, wherein the gain adjusting unit adjusts a gain of the controller so that the gain becomes the nominal phase difference, and compensates the same gain of the actuator as the adjusted gain of the controller.

31. A recording and/or reproducing apparatus to record and/or reproduce data with respect to a disc, comprising:
an recording and/or reproducing head to transfer the data between the disc and the recording and/or reproducing apparatus as a spindle rotates the disc; a sensor to detect a focus and tracking error from the disc and to output a focus and tracking error signal;

an actuator to actuate the optical head;

a driver to drive the actuator;

a controller to control the driver using a control signal and to control the rotation of the spindle; and a vibration detection unit which uses the focus and tracking error output by the sensor and the control signal output by the controller to determine a vibration of the disc rotated by the spindle, wherein the sensor, the controller, the driver, and the actuator form a closed focus and tracking feed back loop to which the vibration of the disc is applied; and wherein the vibration detection unit comprises:
a first vibration measuring unit which measures a first vibration by dividing the focus and tracking error by a sensor gain of the sensor;

a second vibration measuring unit which measures a second vibration from the output signal of the focus and tracking control loop occurring between the actuator and the sensor; and an offset adjusting unit which synthesizes the first vibration and the second vibration, obtains an average value of the synthesized signal for a predetermined time, and adjusts an offset of the synthesized signal using the obtained average value.

32. The recording and/or reproducing apparatus of claim 31, wherein the offset adjusting unit comprises a filtering unit which filters the synthesized signal within a predetermined band.

33. The recording and/or reproducing apparatus of claim 31, wherein the offset adjusting unit removes a rotational component of the calculated vibration comprises a filtering unit which filters the synthesized signal within a predetermined band.

34. The recording and/or reproducing apparatus of claim 31, wherein the first vibration detection unit comprises a low pass filter having a gain that is an inverse of the sensor gain.

35. The recording and/or reproducing apparatus of claim 31, wherein the second vibration detection unit comprises a first order low pass filter and a second order linear system using a DC sensitivity, a resonance frequency, and a Q sensitivity.

36. A method of detecting a vibration of a disc of a recording and/or reproducing apparatus and occurring in a focus and tracking error feed back control loop, comprising:
 detecting a focus and tracking error output by a sensor having a sensor gain, the sensor to detect the focus and tracking error from the disc to be recorded and/or reproduced using a recording and/or reproducing head;
 detecting a control signal output from a controller which controls an actuator in the recording and/or reproducing apparatus according to the focus and tracking error;
 adjusting the control signal and the focus and tracking error to account for the sensor gain, an effect of a driver which receives the control signal to control the actuator, and an effect of the actuator driven by the driver to actuate the recording and/or reproduction head so as to determine the vibration of the disc; and
 adjusting a transfer rate of the disc based on a comparison between a rotation frequency component of the determined vibration of the disc and a reference value, the comparison being used to make a determination as to a disc type so that the transfer rate of the disc is adjusted based on the determined disc type.

37. The method of claim 36, wherein the adjusting the control signal and the focus and tracking error comprises satisfying the following equation in a frequency domain:

$$d(s) = \frac{e(s)}{K(s)} + V(s)P(s)u(s),$$

d(s) is the vibration to be determined represented in the frequency domain,
e(s) is the focus and tracking error output by the sensor represented in the frequency domain,
K(s) is the sensor gain of the sensor represented in the frequency domain,
V(s) is the actuator represented in the frequency domain,
P(s) is the actuator represented in the frequency domain, and
u(s) is the control signal represented in the frequency domain.

38. A method of detecting a vibration of a disc of a recording and/or reproducing apparatus and occurring in a focus and tracking error feed back control loop, comprising:
 detecting a focus and tracking error output by a sensor having a sensor gain, the sensor to detect the focus and tracking error from the disc to be recorded and/or reproduced using a recording and/or reproducing head;
 detecting a control signal output from a controller which controls an actuator in the recording and/or reproducing apparatus according to the focus and tracking error; and
 adjusting the control signal and the focus and tracking error to account for the sensor gain, an effect of a driver which receives the control signal to control the actuator, and an effect of the actuator driven by the driver to actuate the recording and/or reproduction head so as to determine the vibration of the disc;
 wherein the adjusting the control signal and the focus and tracking error comprises:
 adjusting the focus and tracking error using a gain that is an inverse of the sensor gain to produce a first signal,
 adjusting the control signal according to the effects of the driver and the actuator to produce a second signal, and
 combining the first and second signals to calculate the vibration.

39. The method of claim 36, further comprising adjusting the transfer rate at which data is transferred between the recording and/or reproducing head and the disc according to the determined vibration.

40. The method of claim 39, wherein the adjusting the transfer rate comprises:
 categorizing the disc as being an eccentricity-type disc, a deflection-type disc, and a mass eccentric-type disc according to the calculated vibration.

* * * * *

UNITED STATES PATENT AND TRADEMARK OFFICE
CERTIFICATE OF CORRECTION

PATENT NO. : 7,274,640 B2  Page 1 of 1
APPLICATION NO. : 10/229134
DATED : September 25, 2007
INVENTOR(S) : Moon-noh Lee et al.

It is certified that error appears in the above-identified patent and that said Letters Patent is hereby corrected as shown below:

Column 13, Line 40, Claim 11, after "deflection" insert --,--.

Signed and Sealed this

Twenty Second Day of April, 2008

JON W. DUDAS
*Director of the United States Patent and Trademark Office*